July 9, 1940.  J. BAILEY  2,207,426
APPARATUS AND METHOD FOR THE PREPARATION AND HANDLING OF PLASTIC MATERIAL
Filed Feb. 26, 1938
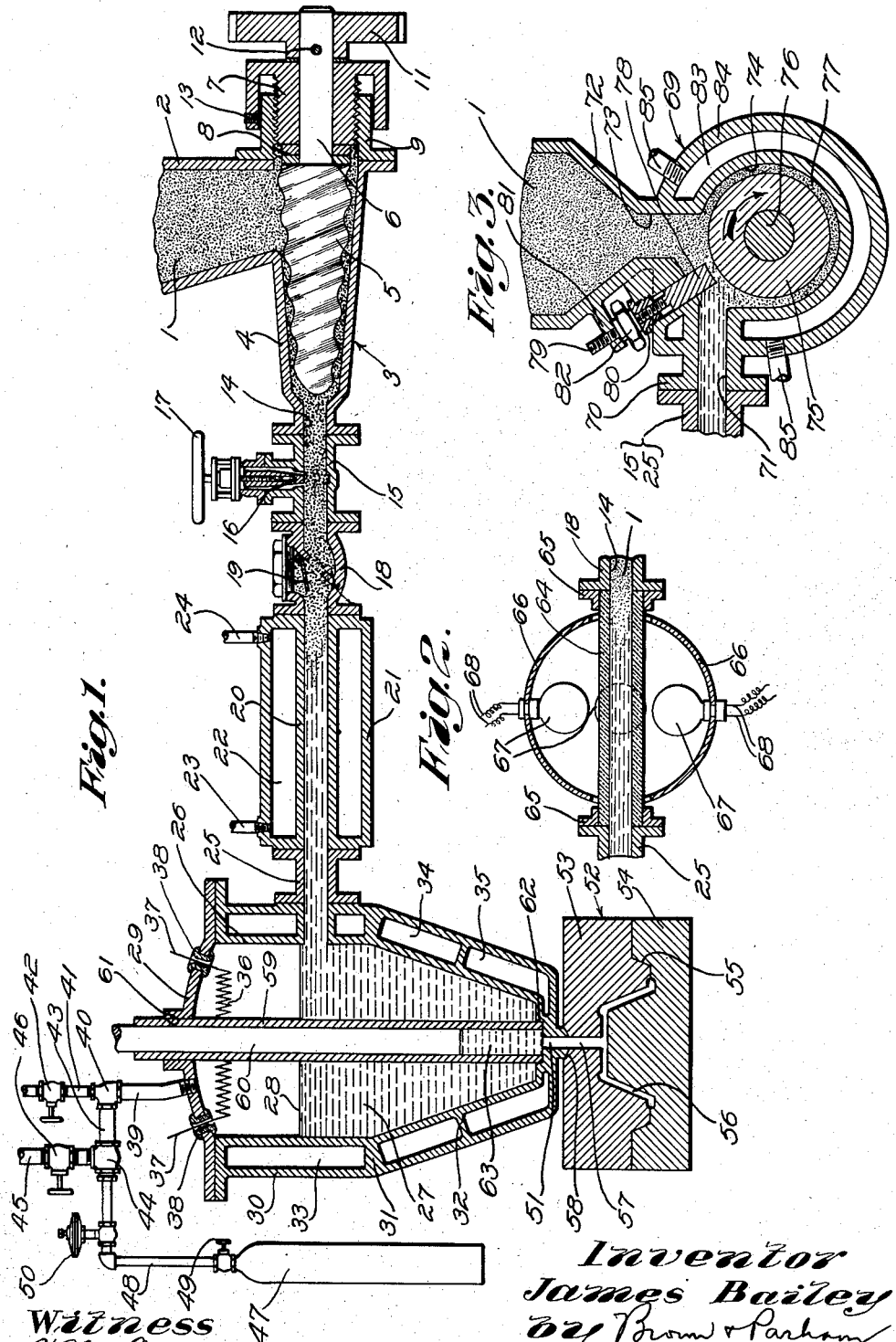
Inventor
James Bailey
by Brown + Parham
Attorneys
Witness
W. B. Thayer

UNITED STATES PATENT OFFICE 2,207,426

APPARATUS AND METHOD FOR THE PREPARATION AND HANDLING OF PLASTIC MATERIAL

James Bailey, West Hartford, Conn., assignor to Hartford-Empire Company, Hartford, Conn., a corporation of Delaware Application February 26, 1938, Serial No. 192,677

30 Claims. (Cl. 18—5)

The present invention relates to apparatus for the preparation of plastic material in a workable state for use and the delivery thereof to a point at which it may be fabricated. More particularly the invention comprises the direct melting of a thermoplastic material, such as a compound of cellulose acetate with plasticizer, in the absence of volatile solvents and diluents, the melting being effected at a relatively high temperature in respect to temperatures previously used in working this type of material, so that the conversion of the material into a homogeneous plastic state is effected almost entirely by temperature.

In the past, the usual way of preparing thermoplastic material, such as cellulose acetate compositions, was to mix the cellulose acetate with a plasticizer and with a certain desired proportion of volatile solvents, and sometimes also diluents, to render the whole a viscous mass, liquid or slurry. This mixture, which was made in a mixing machine, was then rolled between heated rolls to assist in the disintegration of the somewhat fibrous cellulosic material which had not been dissolved by the volatile solvent, and gradually to drive off a certain amount of the volatile solvent and diluent (if used) by evaporation. When the material thus being worked was sufficiently stiff, it was sheeted. The sheets were then cooled and broken or cut into strips, during which time more of the volatile solvent and diluent evaporated, leaving but a relatively small amount of these materials in the strips of plastic material. These strips were then run through a suitable cutting device and cut up into grains. The grains were then dried in an oven to drive off the residual volatile solvent and diluent.

The molding process was then commenced, in the course of which the grains thus prepared were subjected to heat and pressure, sometimes in a cylinder in which the pressure was provided by a ram and heat applied on the outside of the material under compression, passing through the walls of the cylinder to the plastic material by conduction. The plastic mass thus made was then extruded into molds to form articles by the injection or transfer molding process.

Another manner in which this granular plastic material or molding powder was used was to place the material either as a granular or powdered mass or in partially compressed preforms, or both, into heated molds, then press the mass to a desired shape by high pressure, and then cool the molds sufficiently so that the pressed articles had sufficient rigidity to be removed from the molds. All these processes thus involved a relatively large number of steps and were wasteful of heat as well as involving a considerable amount of labor.

Among the objects of the present invention is to provide a method by which plastic material may be treated in a single continuous series of operations, starting with the mixed raw materials, and in the absence of volatile solvents and diluents and may thus be converted to a homogeneous plastic state in which it may be used directly in the fabrication of the desired articles. If desired, this method may be used in the manufacture of molding powder, which may be subsequently employed according to present practices as above outlined; or alternatively the material may be carried completely through to the fabricating operation while still retaining enough heat from that initially supplied for the plastication of the material to keep it in a desired plastic condition from which it is initially cooled subsequent to its fabrication to a desired article shape, thus saving a substantial part of the labor and the heat required in fabricating plastic material according to the previous commercial methods as above outlined.

A further object of the invention is to provide suitable apparatus for carrying out the method above described.

While the method of my present invention and the apparatus disclosed hereinafter for use therewith may be employed in treating various types of plastic materials, I shall refer specifically to thermoplastic cellulose acetate compounds.

Further, while different types of cellulose acetate may be used according to the method, I have found that best results were obtained with a relatively low viscosity cellulose acetate, although the method is fully operable with that having a higher viscosity. For example, cellulose acetate having a 4 second viscosity seems better for my purpose than that having a 50 second viscosity (A. S. T. M. "falling ball test" using a solution of 20% cellulose acetate in 80% acetone). Furthermore, cellulose acetate having a higher acetylation seems to be more desirable than that having a somewhat lower acetylation. In this respect, I have found that 54.6% acetylation cellulose acetate produces somewhat better results than 53.4%.

According to this method, the cellulose acetate is intimately mixed in a finely divided condition with a suitable plasticizer, which may be one single plasticizing material, or a mixture of two or more such materials. The proportion of cellulose acetate to plasticizer is not particularly critical. The proportions of the mixture may comprise cellulose acetate up to 70% or perhaps more, with substantially all the remainder plasticizer. Mixtures of 60 to 70% of cellulose acetate with the balance plasticizer have been found satisfactory.

As to the type of plasticizers which may be used according to my process, the only practical limitation is that the plasticizer be of such character as to be relatively stable at the temperatures to which the mixture is subjected as hereinafter set forth. From a broad point of view, I have found that some of the compatible phthalate compound plasticizers are suitable for this purpose, for example, dialkyl phthalate as dimethyl phthalate and the alkoxy alkyl phthalates, specifically methoxy methyl phthalate, which latter compound is available in the industry under the trade name "Methox." I do not wish, however, to be confined to any one type or composition of plasticizer, but contemplate that any such material which will prove satisfactory in use should be considered within the purview of this invention.

As stated above, I wish to avoid the use of volatile solvents and diluents. By these terms I mean solvents for cellulose acetate having relatively low boiling points, such for example as acetone, and diluents which may not themselves be solvents for cellulose acetate, but which have relatively low boiling points, such for example as methyl or ethyl alcohol or water. All such solvents or diluents are driven off substantially completely wherever used in this art in the fabrication of articles from cellulose acetate compounds and are not permanent constituents of the final product. This is the practical test to be applied in defining volatile solvents or diluents. As contrasted to this, the plasticizers which are permanent constituents of the final products may be and often are solvents for cellulose acetate, but remain in the final product probably in the form of a solid solution with the cellulose acetate, which solution may be either a true or a colloidal solution.

I contemplate that the material used according to my method may contain, in addition to the cellulose acetate and plasticizer, some further materials for the purpose of giving color or body to the product to be made. For example, dyes, lakes or pigments may be included in the composition for coloring the material. Here again the test of suitable materials for this purpose is merely that the materials so used must be of such character as to be relatively stable at the temperatures to which the batch material is subjected, as hereinafter set forth; in other words, any material which will be useful in practice. Furthermore, suitable filling materials may be added in such proportions that they will not interfere with the practical use of the method, such filling materials usually being neutral in character from a chemical point of view and stable at the temperatures used, and being used only in such amounts as will not prevent the proper carrying out of the method.

The method of the present invention comprises heating a batch mixture of the composition above set forth to a sufficiently high temperature so that melting takes place, but applying such temperature so briefly that decomposition does not occur. This temperature is often substantially above the boiling point of the plasticizer used and is so high that if the material were maintained at this desired temperature for an unduly long period, decomposition and charring of the material would take place with a resultant discoloration; and if the high temperature heating were carried far enough, it might render the material wholly unserviceable. For example, temperatures as high as 525° F. have been used successfully in the conversion of a batch of cellulose acetate and plasticizer to a homogeneous plastic mass. Such temperatures are far above those to which it has heretofore been considered practical to heat such materials, but I have discovered that they are entirely practical when applied only for the short time necessary to melt the materials. It has been found that a heating period of not substantially over five to ten minutes may be used. After this melting period, the temperature must be rapidly reduced by a substantial amount in order to bring the temperature of the plasticated mass below any temperature at which decomposition or charring can take place even in a relatively long time. This substantially lower temperature, which may be of the order of 350° F., is however high enough to retain the plastic material in a state of sufficiently low viscosity so that it may be fabricated without the addition of further heat.

As stated above, the temperatures which may be used in melting material are often substantially above the boiling point of the plasticizer. As a result, there is a tendency for the plasticizer to boil, although it may be that the presence of the cellulose acetate gives an effective boiling point for the plasticizer substantially above that which it would have if it were unmixed with the cellulose acetate. On the other hand, the presence of the plasticizer may be said to give an effective melting point for the cellulose acetate substantially lower than its melting point in a pure state. Cellulose acetate alone apparently is substantially decomposed by heat in attempting to melt it and is not worked in this manner. However, there is usually a certain evolution of gas during the high-temperature melting of the batch material resulting in bubbles in the mass. These bubbles may be of two kinds; non-condensable gases, such for example as carbon monoxide or carbon dioxide, resulting from a decomposition of some of the constituents of the batch, and condensable gases, for example volatilized plasticizer.

There are several ways in which these bubbles of gas may be removed from the plastic mass prior to its fabrication, as must be done in order that the final product be homogenized and substantially free from bubbles. In respect to the non-condensable gases, it is sometimes desirable to provide a bath of the plastic material wherein there is a progressive increase in the viscosity from the surface downward, the plastic material from the high heat zone being supplied to the upper portion of the bath and the outlet from the bath to a point of use of the plastic material being adjacent to the bottom thereof. In such a bath the viscosity may be controlled by supplying a certain amount of heat to the surface of the bath from above. Gas bubbles tend to rise through such a bath and are assisted by moving through the progressively less viscous strata thereof. Furthermore, if heat, for example, from a source of high temperature radiant energy, is directed onto the surface of the bath, this will tend not only to establish a desired viscosity difference in different strata of the bath, but also to break bubbles at the surface of the bath and permit the escape of gases therefrom.

Another method of elimination of gases, particularly of non-condensable gases, is to subject the surface of such a bath to a relatively low pressure, for example a vacuum. This may be done intermittently so as intermittently to increase the tendency for gas bubbles to rise through the bath and thus work for the elimination of non-condensable gas bubbles from the bath.

Condensable gases, on the other hand, may be treated partly in the same manner and partly in a somewhat different manner. The provision of the progressively less viscous strata from the bottom toward the top of a bath tends to permit the escape of such bubbles. If this condition is induced by the provision of heat, such as high temperature radiant energy directed onto the top surface of the bath, then the breaking of such bubbles at the surface is assisted. Furthermore, it has been found practical to reduce and in fact substantially to prevent evolution from the material of bubbles of condensable gases, probably principally vaporized plasticizer, by the application of a relatively high pressure over the surface of the bath. This reduces the tendency for the plasticizer to evaporate and in effect causes the condensation and solution of such bubbles of vaporized plasticizer as are in the bath. A further way in which the vaporization of plasticizer can be reduced or prevented is to provide above the bath an atmosphere rich in vaporized plasticizer of the type present in the bath. This method operates in accordance with recognized laws of vapor pressure tending to prevent further volatilization of the same plasticizer from the bath. In practice, it may be advantageous to supply sufficient plasticizer to the material of the bath so that when some of it is vaporized as hereinabove set forth, this vaporized plasticizer will remain above the bath and tend to prevent the further vaporization thereof as aforesaid.

Thus, as there is a desired reason for the use of both pressure and vacuum, it may be found advantageous and is to be considered within the purview of this invention as an object thereof, to provide such different pressures alternately in order to effect the freeing of a bath of plastic material from gas bubbles of both non-condensable and condensable gases.

It may further be found advantageous to provide over such a bath an atmosphere of an inert gas, such as nitrogen, in order that any tendency for any of the constituents of the batch material to oxidize by contact with air may be minimized or prevented. Such a provision is a further specific object of the present invention.

Considered from another point of view, the method comprises the moving of a mass of plastic material, starting as a batch as above set forth, through a succession of zones of different temperatures. In the first of these zones, the material is subjected to a relatively high heat so as quickly to melt the material and to convert it to a homogeneous plastic state in such a short time that no substantial decomposition or charring of the material takes place. In the second of these zones, sufficient heat is abstracted from the material to bring it down to a temperature such that no decomposition or charring of the material can take place even in a relatively long time. In a next or the third zone, the material is brought either up or down, as the case may be, to a temperature desired for the material in its intended use in fabricating articles. The second and third of these steps may advantageously be carried on in a container in which the plastic material is contained as a bath and associated with which are means to regulate the temperatures as aforesaid.

A further object of the invention is to provide for the melting of plastic material at a high temperature as aforesaid by the use of high temperature radiant energy, which may be supplied to the material through transparent walls of a container, such for example as a glass tube through which the material is passed for the melting operation. Such radiant energy may be derived from the incandescent filaments of one or more suitable electric lamps, the rays from which are directed onto the material to be heated and converted to a plastic condition by suitable reflectors.

A further object of the invention is to provide a method as hereinabove set forth according to which the preliminarily mixed plastic material and plasticizer may be intimately mixed by agitation and may simultaneously be preheated before being subjected to the high temperature melting portion of the method. This is desirable in order that a thorough and intimate mixture of the constituent materials be prepared so that the complete melting to the homogeneous plastic mass may take place so rapidly that charring and decomposition is prevented. The preheating also contributes to this general result.

A further object of the invention is to provide a method as above set forth according to which agitation of the material may be effected during the subjection thereof to the high temperature for melting it as aforesaid. Agitation at this point in the method is sometimes desirable in order that the melting take place efficiently.

A further object of the invention is to provide apparatus preferably of such nature that it may be used alternatively as a preheating and agitating device, or as a device wherein the material may be subjected to the high temperature melting step of the method and wherein agitation is desired during such high temperature melting. Specifically, it is desired in this respect that there be an adjustment to control the time the material is subjected to the preheating or the high temperature melting, in accordance with whichever of these two alternatives is being used by controlling the proportion of the material deflected from an orbital path in which it is being moved for heating and agitation.

As above set forth, it may be desirable to subject the bath of plastic material to vacuum, pressure or both in an alternate manner. This may interfere with the application of pressure on the material for supplying it to a point of use; therefore a further object of the invention is to provide means by which the plastic material may be first segregated from the main body of plastic material being treated in a bath as aforesaid and then supplied to a point of use at a pressure independent of any pressure or pressures to which the plastic material is previously subjected as above outlined.

Other and more specific objects and advantages of the present invention will become apparent from the following description and appended claims when taken in conjunction with the accompanying drawing, in which:

Figure 1 illustrates diagrammatically and in central vertical section an apparatus by which plastic material may be moved through a plurality of zones and by which heat and suitable pressure or pressures may be applied to the material to convert it to a plastic condition and then to control its temperature to a desired point for fabrication, one type of fabrication means also being shown in conjunction therewith;

Fig. 2 illustrates similarly in vertical section an alternative form of heating means for the high temperature zone through which plastic material is passed; and Fig. 3 illustrates somewhat diagrammatically and in central vertical section a device which may alternatively be used for preheating and agitation, or for the high temperature melting accompanied by agitation, this device being adapted to be associated alternatively with different portions of the structure shown in Fig. 1.

While it will be understood that the method and apparatus of the present invention and hereinafter to be specifically described may be used for the preparation of plastic materials starting with various basic materials, including not only cellulosic materials, but other thermoplastic materials, the present invention will be explained in its connection with cellulose acetate material.

The cellulose acetate in a finely divided condition is first intimately mixed in some suitable way with plasticizer, as hereinabove defined. This mixture may or may not also contain a coloring material as above defined and/or certain amounts of inert filling materials. The batch thus prepared and indicated at 1 is suitably supplied to a hopper portion 2 of a screw type feeding means 3, including a chamber 4 which is preferably tapered and which may be integral with the hopper 2 as shown. Arranged for revolution within the tapered chamber 4 is a screw 5, carried by a shaft 6 which is journaled in a bearing member 7, suitable means 8 being provided to take up the end thrust of the screw 5. The bearing member 7 is threaded as shown into a bushing 9, which may be suitably secured to the hopper 2 and/or the chamber 4. The shaft 6 has a driving means here shown as a gear 11 suitably secured thereto as by a pin 12. Any suitable means (not shown) may be provided for driving the gear 11. By the means shown, the shaft 6 is prevented from endwise movement in respect to the bearing member 7. This bearing member may be threaded more or less into the bushing 9, so as to control the longitudinal position of the screw 5 and thereby to control the wall clearance between the screw 5 and the inside of the tapered chamber 4. This adjustment may be secured after it has been made by any suitable means as a set screw 13.

By the means thus far described, or by any other batch propelling means, the batch material 1 may be fed through subsequent portions of the apparatus. The essential requirement in this respect is that some means be provided by which the plastic material may be fed progressively through the apparatus, the means heretofore described in detail and shown in the drawing being merely one example of a means usable for this purpose. The means thus described forces the batch material 1 through a plastic material passage shown at 14.

The next section of the passage 14 is formed in a member 15, which is provided with a conventional type of gate valve, generally indicated at 16, and controlled by a hand wheel 17. This valve may or may not be used, as desired. It may, however, be desirable at times to cut off the supplying of plastic material to the remainder of the apparatus.

The next portion of the plastic material passage 14 is formed in a member 18 which includes a gravity-closed check valve 19. Such a valve is preferably provided as it may be desired to build up pressure in subsequent portions of the apparatus, which pressure should not be communicated back to the feeding portion thereof heretofore described.

The next section of the apparatus, including what is in effect a continuation of the plastic material passage 14 is that in which the batch material is melted to convert it to a homogeneous plastic mass. This section comprises a member 20 surrounded by a casing 21 which may be integral therewith, as shown, or separate therefrom, and which provides a chamber 22 through which a temperature controlling fluid, in this case a heating fluid, may be passed through pipes 23 and 24. During its passage through this zone of the apparatus, the plastic material is melted down from the condition in which it existed as the batch material 1 to a substantially homogeneous plastic mass, as shown by the transition from the stippled showing of the material to that portion showing the plactic material as a liquid.

The temperature to which the material is raised during its passage through this portion of the apparatus may be substantially above the boiling point of the plasticizer used and may be in the neighborhood of 525° F. It has been found that there is a temperature-time relationship for the decomposition or charring of cellulose acetate compounds, that is, that such compounded and mixed material in the form of the batch 1 may be subjected to a relatively high temperature, such for example as that contemplated herein, if it is exposed to that temperature for but a short time. For example, a period of approximately 5 to 10 minutes is often sufficient to convert such a batch material into a homogeneous semi-liquid or plastic mass without such decomposition or charring as substantially to discolor the molten material; while if this same material be subjected to the same temperature for a longer period of time, for instance 20 to 30 minutes, the decomposition of part at least of the material would take place to such an extent that it would be badly discolored; and further, if the same material be subjected to the same temperature for a still longer period of time, for example 60 minutes, there remains only a charred mass which is useless for any commercial purposes as a plastic material. It is necessary, therefore, that the material be moved out of this high temperature zone and into a zone of substantially lower temperature within a certain limited time, which is done according to my present invention and may be effected by the apparatus herein disclosed. This lower temperature shown may be from 300° to 400° F., according to the particular composition of the plastic material, but in any event, is so regulated as to be below any temperature at which the material being worked can decompose or char even in a relatively long time.

For this purpose, the material is conducted through a member 25 forming a continuation of the plastic material passage 14 to the interior of a chamber formed of an inner casing 26, wherein the plastic material is contained as a relatively deep bath 27. The plastic material is supplied to the bath 27 adjacent to the top surface 28 thereof. The outlet from the bath 27 is adjacent to the bottom thereof. The chamber 26 is preferably provided with a cover member 29, which is closed to the free passage of pressure, but which has several apertures therethrough as hereinafter specifically set forth.

The inner casing 26 is surrounded by an external jacket 30 to provide a space between the inner casing and the jacket which is sub-divided into a plurality of vertically separated zones by webs 31 and 32 to provide separate temperature controlling chambers 33, 34 and 35. It will be understood that as many of these temperature controlling chambers as desired may be provided at different levels and that provision is made in a manner not herein specifically illustrated for the separate circulation of fluids through each of these chambers independently of each other, so that it is possible to establish different and independently controlled temperatures at different vertical zones or strata in the bath 27 of plastic material. For example, it may in some cases be desired to cool the material as it first arrives in the bath from the heating means, so that the chamber 33 may be used as a cooling chamber to abstract sufficient heat from the plastic material to bring it down from its high temperature in the heating zone in passing through the member 20 down to the permissive temperature in the bath 27 and thus to prevent decomposition of the plastic material. Alternatively, when working at a relatively low rate of speed, it may be desired either to maintain the temperature in the upper portion of the bath, allowing natural cooling through other portions of the apparatus to accomplish the desired lowering of temperature, or actually to heat the plastic material in this portion of the device. The chambers 34 and 35 are used to bring the temperature of the material progressively to a desired temperature for subsequent use in fabricating articles or otherwise. For example, if it is desired that the material be supplied through the outlet of the chamber 26 at a particular temperature, the material is preferably gradually brought to that temperature by heat transmission in the necessary direction through the walls of the inner casing 26 to or from the temperature controlling fluids being circulated through the chambers 34 or 35 or both.

As above set forth, it is desired that means be provided for establishing a progressively less viscosity through the bath 27 from the bottom toward the top thereof. For this purpose, it may be desired to supply heat preferably in the form of high temperature radiant energy onto the top surface 28 of the bath of plastic material. As shown, there is provided within the casing 26 above the surface 28 of the plastic material an electric coil 36, the leads 37 for which are passed through insulating bushings 38 arranged in the cover 29 for the casing 26. Provision is made in connection with these bushings for the prevention of leakage therethrough although in the diagrammatic illustration shown in the drawings, these bushings appear to be open. While there is shown an open coil 36 for supplying heat, I contemplate that this coil may be an incandescent filament enclosed within a glass envelope, as an electric lamp bulb, and that any desired number of heating elements or lamps may be used to supply energy uniformly to the surface of the bath and thus to aid in the freeing of the bath from bubbles by the establishment of viscosity differences in different strata of the bath and by assisting in breaking the bubbles at the surface 28 thereof.

Also, as above set forth, it is desired that means be provided for establishing a desired pressure or alternately used variations in pressure above the bath 27 within the casing 26. For this purpose, a pipe 39 communicates with the inside of the casing 26 through the cover 29 thereof, this pipe having a T-fitting 40 therein, which is connected with a pipe 41 from a source of air under pressure. Flow through the pipe 41 is controlled by a valve 42. The fitting 40 is also connected with a pipe 43, which communicates through a T-fitting 44 with a pipe 45 controlled by a valve 46. This pipe 45 may communicate with a suitable source of sub-atmospheric pressure, such as a vacuum pump and/ or chamber associated therewith. Thus by closing the valve 42 and opening the valve 46, the space within the casing 26 above the plastic material may be suitably evacuated. Pressure and vacuum may be alternately applied by suitably manipulating the valves 42 and 46. Furthermore, while manually operable valves are here shown, I contemplate that any suitable automatic mechanism (not shown) may be employed for controlling pressure or vacuum or the alternate use of both.

Also, as above set forth, it may be desired that an inert gas, such as nitrogen, be introduced within the casing 26 above the plastic material. For this purpose, there is illustrated a conventional tank 47, which may contain nitrogen under high pressure, this gas being passed through a pipe 48 to the fitting 44 and thence through the pipes 43 and 39 to the inside of the casing 26. Flow of nitrogen through these pipes is controlled by a manually operable valve 49 and an automatic pressure reducing valve 50, both of which are shown conventionally and may be operated manually as shown, or by any desired automatic mechanism.

The bottom of the casing 26 is provided with a suitable aperture 51 through which the plastic material may flow or be forced to a point of use, here shown as a mold 52 and comprising separable upper and lower mold members 53 and 54. This mold may be mounted in any desired manner upon supporting means (not shown) and may be provided with suitable means by which the separable portions thereof may be independently supported and moved. In the operative and closed position of the mold as shown, the mold parts are fixed against relative lateral movement by interlocking portions indicated at 55. The mold cavity, of course, may take any desired form, that shown at 56 being merely for purposes of illustration. This mold cavity communicates through a passage 57 in the upper portion 53 of the mold with the passage 51 with which it is aligned by interlocking portions of the lower end of the outer casing 30 and the upper portion 53 of the mold, as shown at 58.

In some instances, the pressure applied over the bath 27 in the casing 26 may be uniform and of a desired intensity for supplying the plastic material through the passages 51 and 57 to the mold cavity. However, it is often desired that the pressure within the casing 26 be regulated in accordance with the desired operations or method steps to be carried out within the casing 26, which may not accord with the pressure desired for supplying material to the point of use. In order that these pressures may be independent each of the other, and further in order that a charge may be segregated from the main bath 27 of plastic material, I have provided a concentric sleeve 59 and plunger 60 therein, both of which pass through an aperture 61 in the cover 29 of the casing 26. Means (not shown) may be provided for independently moving the sleeve 59 and plunger 60 in a desired manner.

One manner of operating these parts is first to raise both the plunger and sleeve to a desired extent permitting the plastic material to flow into and fill the space previously occupied by the lower portions thereof. The sleeve 59 may then be lowered until its lower end is tightly seated in a recess 62 formed in the lower portion of the inner casing 26 concentric with the aperture 51. This will confine a segregated portion of plastic material 63 within the lower end of the sleeve 59 and beneath the plunger 60. This portion is calculated to be the amount necessary to fill a mold by injection and is regulated by the uppermost positions of the plunger and sleeve. When subsequently the plunger 60 is lowered, the portion 63 of plastic material is driven, by a force measured by the force applied to the plunger, through the passages 51 and 57 to fill the mold cavity 56 communicating therewith at a pressure independent of any pressure effective on the plastic material during its previous preparation and particularly independent of any pressure within the casing 26 effective on the surface 28 of the plastic material therein.

While I have disclosed the operation of supplying plastic material to fill a mold cavity by injection, I contemplate that the plastic material prepared as aforesaid may be used in this or any other desired manner and may even be passed through the passage or aperture 51 and thereafter suitably disintegrated to make a molding powder, which may be employed in any way desired, including those now in common use in the art. The particular use made of the plastic material as prepared according to my method is not to be considered an essential part of the present invention in its broader aspects.

In Fig. 2, I have illustrated a modified form of means by which the plastic batch material 1 may be heated and converted to a homogeneous plastic mass by raising it to a relatively high temperature as above set forth. As shown, this comprises a portion 64 forming a part of the plastic material passage 14, which portion may be a glass tube or other rigid means transparent to high temperature radiant energy. This tube is provided at its ends with metallic flange members 65 by which it may be connected to the contiguous portions 18 and 25 of the plastic material passage. Surrounding the glass tube 64 is one or more reflecting means 66 within which are a plurality of high powdered incandescent lamps 67 to which current may be supplied in a suitable manner from line wires 68. The filaments within the bulb 67 are of such character that they will emit high temperature radiant energy in sufficient amounts to raise the temperature of the plastic material passing through the passage 14 within the glass tube 64 to a desired point and cause the conversion of this plastic material to a homogeneous plastic state.

This action is assisted by the penetrating effect of the radiant energy, due to the fact that plastic material, of many types at least, is somewhat transparent, so that the heating effect of the radiant energy penetrates all through the plastic material and heats it substantially uniformly, rather than from the outer surface only and by conduction. This is desirable in certain instances as the conductivity of the plastic material is quite low and it is sometimes difficult to heat the center portion of a relatively thick body of plastic material before the heat effective on the outer portions has started the decomposition of such outer portions. It will be understood that the structure shown in Fig. 2 may be substituted for the corresponding portion in Fig. 1 in a similar type of apparatus, the remaining portions of the apparatus being the same or of some equivalent construction and the operations being otherwise substantially the same.

In Fig. 3 I have illustrated a device which may be used alternatively either as a preheating and agitating means or as a high temperature melting and agitating means. For this purpose, the device which is shown generally at 69 is provided with a coupling flange 70 associated with its outlet passage 71, which may be connected alternatively to the members 15 or 25 of Fig. 1 for these two alternative purposes respectively.

This device comprises a hopper portion 72 to which plastic material 1 in a preliminarily mixed state may be supplied. The material 1 descends through a lower outlet 73 of the hopper into a cylindrical chamber 74 axially of which is a drum-like member 75 mounted on a rotatable shaft 76 which is adapted to be driven at a desired speed in the direction of the arrow by any suitable means (not shown). Between the drum member 75 and the wall of the chamber 74 there is defined a relatively thin passage 77 through which the plastic material is passed. This passage leads from the inlet 73 of the chamber 74 to the outlet 71 as shown and also communicates between the outlet and the inlet, so that some at least of the plastic material may be passed repeatedly around the periphery of the drum in an orbital path.

Means are provided for controlling the proportion of the material continuously passed around the periphery of the drum in an orbital path and thus continuously agitated by the movement and heated as hereinafter set forth, and the complementary proportion of material which is deflected out through the outlet passage 71. For this purpose there is provided an adjustable doctor 78 mounted for movement in a slot in the housing forming the chamber 74 in a direction substantially radial of the drum member 75. As shown, the doctor 78 is provided with a threaded stem 79 which passes freely through a bushing member 80 and also through a bracket member 81, which may be integral with the hopper member 72. Between the bushing 80 and the bracket 81 is a nut 82 threaded on the stem 79. Thus, rotation of the nut will be effective to move the doctor radially toward or away from the drum member 75 to control the proportion of the plastic material which may be continuously moved through the orbital path surrounding the drum and the complementary proportion which will be deflected by the doctor out through the exit passage 71.

Any desired heating means may be provided for supplying heat to the plastic material in the device 69, the one shown being by way of example only. Surrounding the hollow cylindrical passage 77 through which the plastic material moves is a semi-annular chamber 83 formed between the wall of the chamber 74 and an outer wall 84. Suitable means, such as inlet and outlet pipes 85, may be provided for passing a temperature controlling fluid through the chamber 83, thus to supply heat to the material being agitated and moved through the passage 77 as aforesaid.

When the device 69 is coupled to the member 15 and used as a preheating and agitating device for supplying preheated and thoroughly mixed plastic material to the high heating zone in the member 20, the temperature of the fluid within the chamber 83 will usually be relatively low, such as not to heat the plastic material to a point which will cause any substantial melting thereof, although higher temperatures resulting in partial melting may be used if desired. In the meantime, this material is being thoroughly agitated and mixed and heated through so that the subsequent high temperature heating thereof is rendered easier, both by the fact that less heat need be provided in the high heat zone to bring it to a given high temperature and for the reason that the material is so thoroughly mixed at the time it is supplied to the high heat zone that it may be melted or converted to a homogeneous plastic state at a relatively lower temperature than would be possible to use were the material not so thoroughly mixed.

I have found, for example, that when cellulose acetate and plasticizer are not thoroughly mixed and an attempt is made to melt them together by high temperature, some of the cellulose acetate is still unmelted after exposure to the high temperature for substantially as long a time as is permissible without decomposition or charring the material. This objectionable result is eliminated, however, by first thoroughly mixing the cellulose acetate and the plasticizer together and by preheating this mixture.

If, on the other hand, the device 69 be used as the high temperature melting device and coupled directly to the member 25 of the plastic material passage in place of all the structure shown to the right of this member in Fig. 1, certain plastic materials may be suitably melted and converted to a homogeneous plastic state by subjecting them to agitation concomitantly with their subjection to the high temperature, which in this case is provided by passing a highly heated fluid through the chamber 83.

While I have shown and described but a few possible embodiments of my invention and have particularly described the application thereof merely to cellulose acetate compounds, I do not wish my invention to be limited except by the scope of the appended claims, which are to be construed as broadly as the state of the prior art permits.

I claim as my invention:

1. The method of preparing plastic material in a workable state, comprising intimately mixing cellulose acetate with plasticizer to form a mixture containing only materials having negligible rates of vaporization at room temperature, subjecting said mixture to a temperature high enough to cause decomposition or charring, to cause a rapid melting of the material to a homogeneous plastic mass but in such a short time that no substantial decomposition or charring of the material takes place, thereafter cooling the material below a temperature at which decomposition or charring thereof can take place even in a relatively long time but such that the material is still sufficiently plastic and flowable that it may subsequently be molded, maintaining a body of the material cooled as aforesaid at a temperature at which it remain plastic and moldable, and passing the material thus prepared from this body to a point of use.

2. The method according to claim 1 in which the high temperature to which the material is heated in converting it to a homogeneous plastic mass is above the boiling point of the plasticizer contained therein.

3. The method according to claim 1 in which the high temperature to which the material is heated in converting it to a homogeneous plastic mass is above 500° F.

4. The method according to claim 1 wherein the mixture of cellulose acetate and plasticizer is moved successively through a first zone wherein the material is highly heated to convert it to a homogeneous plastic mass, a second zone wherein the temperature of the mass is lowered substantially to a point at which decomposition and charring of the material will not take place even in a relatively long time but in which the material is still maintained at a low enough viscosity to permit subsequent molding, and a third zone wherein the temperature of the material is adjusted to that desired for the subsequent fabrication thereof by molding.

5. The method according to claim 1 wherein the material is maintained at substantially atmospheric pressure throughout the preparation of the material for use.

6. The method according to claim 1 wherein the material after it has been highly heated is subjected to a selected pressure to control the evolution of gas from the material throughout the cooling thereof to a temperature such that decomposition or charring will not take place even in a relatively long time.

7. The method of preparing plastic material in a workable state, comprising intimately mixing cellulose acetate with plasticizer to form a mixture containing only materials having negligible rates of vaporization at room temperature, passing the material through a heating zone and therein subjecting the material to a temperature high enough to cause decomposition or charring to cause a rapid melting of the material to a homogeneous plastic mass in such a short time that no substantial decomposition or charring of the material takes place, thereafter passing the material to a cooling zone wherein the material is maintained in a bath, controlling the temperature of the bath of material in the cooling zone in such manner that the temperature will be below any temperature at which decomposition or charring of the material can take place even in a relatively long time and wherein there is a temperature gradient such that the temperature is progressively lower from top to bottom of the bath of the plastic material, maintaining the temperature of the material in the upper strata of the bath sufficiently high to assist in the discharge and breaking of bubbles of gas and thereby freeing the viscous mass of plastic material from bubbles, and passing the material, as thus conditioned as to temperature and freed from bubbles, to a point of use.

8. The method according to claim 7 wherein the freeing of the bath from bubbles is effected by exposing the surface of the bath to high temperature radiant energy.

9. The method of preparing plastic material in a workable state, comprising intimately mixing cellulose acetate with plasticizers to form a mixture containing only materials having negligible rates of vaporization at room temperature, passing the material through a heating zone and therein subjecting the material to a relatively high temperature to cause a rapid melting of the material to a homogeneous plastic mass in such a short time that no substantial decomposition or charring of the material takes place, thereafter passing the material to a cooling zone wherein the material is maintained in a bath, cooling the material in this zone to a temperature such that no substantial decomposition or charring of the material can take place even in a relatively long time, subjecting the material at one time during the cooling to a vacuum to assist in the freeing of the material from non-condensable gases, subjecting the material at another time during the cooling to a substantially higher pressure to cause the condensation and solution of condensable gases and thereby freeing the plastic mass from bubbles, and subsequently passing the material thus freed from bubbles to a point of use.

10. The method according to claim 1 wherein the plastic material is fabricated by injection molding in such manner that the pressure applied to the material to cause it to move into the mold is independent of any pressure effective on the material during the preparation thereof for use.

11. The method of preparing plastic material in a workable state, which comprises intimately mixing cellulose acetate and plasticizer to form a mixture containing only materials having negligible rates of vaporization at room temperature, passing said mixture successively through a high temperature zone, a zone of substantially lower temperature and a zone in which the temperature is regulated in accordance with the desired temperature at which the material is to be subsequently fabricated, supplying heat in the form of high temperature radiant energy to the material in the high temperature zone to raise its temperature to a point such that the material will rapidly melt to a homogeneous plastic mass in such a short time that no substantial decomposition or charring of the material will take place, abstracting sufficient heat from the material in the second of said zones to cool the material to a temperature at which no decomposition or charring thereof can take place even in a relatively long time, and controlling the temperature of the material in the third of said zones to bring it to a desired temperature for subsequent fabrication.

12. The method of preparing plastic material in a workable state, which comprises intimately mixing cellulose acetate and plasticizer to form a mixture containing only materials having negligible rates of vaporization at room temperature, subjecting said mixture to a relatively high temperature to cause a rapid melting of the material to a homogeneous plastic mass in such a short time that no substantial decomposition or charring of the material can take place, thereafter rapidly lowering the temperature of the material to a point such that no decomposition or charring can take place even in a relatively long time, maintaining in contact with the material during the aforesaid steps of the method an inert gaseous atmosphere so as to prevent oxidation of the material, and controlling the temperature of the material to bring it to a desired point for subsequent use.

13. The method of preparing and fabricating plastic material, comprising the steps of intimately mixing finely divided, low viscosity, cellulose acetate, with a plasticizer of the type which will be relatively stable at the temperature to which the material is later heated to form a mixture containing only materials having negligible rates of vaporization at room temperature, moving said mixture into a high temperature zone, raising the temperature of the mixture in this zone to a point above the boiling point of the plasticizer and above 500° F., retaining the mixture in the high temperature zone for a melting period of from five to ten minutes during which time no substantial decomposition or charring of the material can take place, moving the heated and melted material completely out of the high temperature zone and into a cooling zone which comprises a container wherein the material is contained as a bath, directing high temperature radiant energy onto the surface of the bath in the container while extracting heat laterally from the bath and thus establishing in the bath a temperature gradient which is progressively lower from the top to the bottom of the bath to assist in freeing the bath from bubles, establishing over the bath an atmosphere of an inert gas at a selected and controlled pressure, and supplying the material from the lower strata of the bath to a point of fabrication by pressure effective on segregated portions of the material and independent of any pressures effective on the material at earlier stages in the method as aforesaid.

14. Apparatus for preparing plastic material in a workable state, comprising means for passing a mixture comprising cellulose acetate and plasticizer and including no volatile solvents or diluents through a plurality of zones, the first of said zones being formed by a means defining a passage for said mixture, means for supplying heat by conduction through the walls of the passage forming means in said first zone so constructed and arranged as to heat said mixture to a relatively high temperature to melt it in such a short time that no substantial decomposition or charring of the material can take place, means associated with the second of said zones for positively abstracting heat from the molten mass of plastic material to bring it to a relatively lower temperature such that no decomposition or charring of the material can take place even in a relatively long time but still high enough so that the material has a viscosity such that it may flow and be molded, and means associated with a third of said zones for controlling the temperature of the plastic material to bring it to a desired point for the subsequent molding of the plastic material.

15. Apparatus for preparing plastic material in a workable state, comprising means for passing a mixture comprising cellulose acetate and plasticizer and including no volatile solvents or diluents through a plurality of zones, passage forming means composed of material transparent to radiant energy forming the first of said zones through which said mixture is passed, means for directing high temperature radiant energy into the material during its passage through said first zone for heating it to a relatively high temperature to melt it in such a short time that no substantial decomposition or charring of the material can take place, and means associated with a second of said zones for abstracting heat from the molten mass of plastic material to bring it to a relatively lower temperature such that no decomposition or charring of the material can take place even in a relatively long time.

16. Apparatus for preparing plastic material in a workable state, comprising means for passing a mixture comprising cellulose acetate and plasticizer and including no volatile solvents or diluents through a plurality of zones, means associated with the first of said zones for supplying heat to the mixture to heat it to a relatively high temperature to melt it in such a short time that no substantial decomposition or charring of the material can take place, a container for holding a bath of the molten plastic material comprising the second of said zones, means to conduct the plastic material from the first of said zones to the upper portion of said container, means associated with the lower portion of said container for the discharge of plastic material therefrom, and means for controlling the temperature of the bath of material in said container so constructed and arranged as to establish and maintain a decreasing temperature gradient downwardly through the bath of plastic material in said container.

17. Apparatus for preparing plastic material in a workable state, comprising means for passing a mixture comprising cellulose acetate and plasticizer and including no volatile solvents or diluents through a plurality of zones, means associated with the first of said zones for supplying heat to the mixture to heat it to a relatively high temperature to melt it in such a short time that no substantial decomposition or charring of the material can take place, a container for holding a bath of the molten plastic material comprising the second of said zones, means to conduct the plastic material from the first of said zones to the upper portion of said container, means associated with the lower portion of said container for the discharge of plastic material therefrom, and means for supplying heat to the surface of the bath of plastic material in said container tending to cause bubbles of gas to move upwardly to the surface of the plastic material and to break at the surface so as to free the plastic material in said container from bubbles.

18. Apparatus in accordance with claim 17 wherein the last named heat supplying means comprises an incandescent heated body positioned in said container above the surface of the bath of plastic material therein for supplying high temperature radiant energy onto the surface of the plastic material.

19. Apparatus for preparing plastic material in a workable state, comprising means for passing a mixture comprising cellulose acetate and plasticizer and including no volatile solvents or diluents through a plurality of zones, means associated with the first of said zones for supplying heat to the mixture to heat it to a relatively high temperature to melt it in such a short time that no substantial decomposition or charring of the material can take place, a container for holding a bath of the molten plastic material comprising the second of said zones, means to conduct the plastic material from the first of said zones to the upper portion of said container, means associated with the lower portion of said container for the discharge of plastic material therefrom, and means for controlling and varying the pressure in said container above the bath of plastic material therein to control the vaporization of any volatile constituents of the plastic mass and to control the evolution of bubbles of gaseous material from the plastic material.

20. Apparatus for preparing and fabricating plastic material, comprising means for passing a mixture of cellulose acetate and plasticizer through a plurality of zones, means associated with the first of said zones for supplying heat to the mixture to heat it to a relatively high temperature to melt it in such a short time that no substantial decomposition or charring of the material can take place, means associated with a second of said zones for abstracting heat from the molten mass of plastic material to bring it to a lower temperature such that no decomposition or charring of the material can take place even in a relatively long time, means associated with a third of said zones for controlling the temperature of the plastic material to bring it to a point desired for the fabrication thereof, and means for supplying the material under pressure to a fabricating point in such manner that the pressure effective on the plastic material for supplying it from the third of said zones to a fabricating point is independent of any pressure effective on the material during its prior preparation for use.

21. Apparatus for preparing plastic material in a workable state, comprising means for passing a mixture comprising cellulose acetate and plasticizer and including no volatile solvents or diluents through a plurality of zones, means associated with the first of said zones for supplying heat to the mixture to heat it to a relatively high temperature to melt it in such a short time that no subsantial decomposition or charring of the material can taken place, a container for holding a bath of the molten plastic material comprising the second of said zones, means to conduct the plastic material from the first of said zones to the upper portion of said container, means associated with the lower portion of said container for the discharge of plastic material therefrom, means for adjustably controlling and varying the pressure effective in said container above the bath of plastic material therein, a plunger and a sleeve associated with said container and with the outlet passage therefrom and adapted to be independently operated, said plunger and sleeve being so constructed and arranged that a charge of plastic material may be segregated from the remainder of the mass by the movement of said sleeve toward the outlet of said container during the time the plunger is retracted and the segregated charge may then be forcibly expelled through the outlet of said container by said plunger at a pressure independent of the pressure effective on the surface of said bath in the container.

22. Apparatus for preparing plastic material in a workable state, comprising means for passing a mixture comprising cellulose acetate and plasticizer and including no volatile solvents or diluents through a plurality of zones, means associated with the first of said zones for supplying heat to the mixture to heat it to a relatively high temperature to melt it in such a short time that no substantial decomposition or charring of the material can take place, a container for holding a bath of the molten plastic material comprising the second of said zones, means to conduct the plastic material from the first of said zones to the upper portion of said container, means associated with the lower portion of said container for the discharge of plastic material therefrom, and means associated with the upper portion of said container for supplying thereto an inert gas to establish over the bath of plastic material in said container an inert gaseous atmosphere and thereby to prevent undesired oxidation of the plastic material or any constituents thereof during its preparation.

23. Apparatus for preparing plastic material in a workable state, comprising means for passing a mixture comprising cellulose acetate and plasticizer and including no volatile solvents or diluents through a plurality of zones, means associated with the first of said zones for supplying heat to the mixture to heat it to a relatively high temperature to melt it in such a short time that no substantial decomposition or charring of the material can take place, a container for holding a bath of the molten plastic material comprising the second of said zones, means to conduct the plastic material from the first of said zones to the upper portion of said container, means associated with the lower portion of said container for the discharge of plastic material therefrom, means associated with said container for controllably supplying pressure to the upper portion thereof above the bath of plastic material therein so as to establish a superatmospheric pressure in said container above said bath, and selectively usable means for controllably evacuating the upper portion of said container, whereby super or sub-atmospheric pressure may be selectively supplied to said container above the plastic material therein and these pressures may be used alternatively or alternately.

24. The method of preparing plastic material in a workable state, comprising mechanically mixing cellulose acetate and plasticizer to form a mixture containing only materials having negligible rates of vaporization at room temperature, concomitantly preheating such mixed material and agitating it in order to insure the thorough and intimate mixture of the constituent materials and to heat it up to a predetermined temperature, thereafter and before the material has lost the heat imparted to it as aforesaid subjecting the material to a relatively higher temperature to cause a rapid melting thereof to a homogeneous plastic mass in such a short time that no substantial decomposition or charring of the material takes place, thereafter cooling the material to a temperature such that no decomposition or charring thereof can take place even in a relatively long time but such that the material is still sufficiently plastic and flowable that it may subsequently be molded, and then passing the material thus prepared to a point of use.

25. The method of preparing plastic material in a workable state, comprising mixing cellulose acetate and plasticizer to form a mixture containing only materials having negligible rates of vaporization at room temperature, concomitantly preheating such mixed material and agitating it by moving it in an orbital path in order to insure the thorough and intimate mixture of the constituent materials and heating it up to a predetermined temperature, controlling the rate of movement of the mixed and preheated materials from the orbital path and passing thereof to subsequent steps of the process, thereafter and before the material has lost the heat imparted to it as aforesaid, subjecting the material thus removed from the orbital path to a relatively higher temperature to cause the melting thereof to a homogeneous plastic mass in such a short time that no substantial decomposition or charring of the material takes place, thereafter cooling the material to a temperature such that no decomposition or charring thereof can take place even in a relatively long time but such that the material is still sufficiently plastic and flowable that it may subsequently be molded, and then passing the material thus prepared to a point of use.

26. Apparatus for preparing plastic material in a workable state, comprising means for preheating and concomitantly mixing cellulose acetate and plasticizer in the absence of volatile solvents and diluents and for moving the mixed and preheated material out of the preheating zone, means associated with the first named means and arranged to receive preheated and mixed plastic material therefrom for subjecting the mixed and preheated material to a relatively high temperature to melt it in such a short time that no substantial decomposition or charring of the material can take place, and means arranged to receive highly heated and molten plastic material from the last named means for bringing the plastic material to a lower temperature such that no decomposition or charring of the material can take place even in a relatively long time.

27. Apparatus for preparing plastic material in a workable state, comprising means for preheating and concomitantly mixing cellulose acetate and plasticizer in the absence of volatile solvents and diluents and for moving the premixed and heated material out of the preheating zone, said means including rotating and stationary parts providing therebetween an orbital passage in which the mixed plastic materials are preheated and agitated, means associated with one of said parts for controlling the movement of the plastic material between said parts and the proportion thereof deflected to a subsequent part of the apparatus, means associated with the above means and arranged to receive plastic material deflected therefrom for subjecting such plastic material to a relatively high temperature to melt it in such a short time that no substantial decomposition or charring of the material can take place, and means arranged to receive highly heated and molten plastic material from the last named means for bringing the plastic material to a lower temperature such that no decomposition or charring of the material can take place even in a relatively long time.

28. Apparatus for preparing plastic material in a workable state, comprising a stationary casing which is adapted to be supplied with a mixture of cellulose acetate and plasticizer in the absence of volatile solvents and diluents, means associated with said casing for heating plastic material supplied thereto to preheat it to a desired extent, a smooth surfaced rotatable drum arranged within said casing and adapted by its rotation to move plastic material in an orbital path in said casing, an adjustable doctor associated with said casing and arranged to control the proportion of the plastic material being moved in an orbital path by said drum and the complementary proportion deflected from said casing, means associated with and arranged to receive preheated and mixed plastic material deflected from said casing for subjecting the mixed and preheated material to a relatively high temperature to melt it in such a short time that no substantial decomposition or charring of the material can take place, and means arranged to receive highly heated and molten plastic material from the last named means for bringing the plastic material to a lower temperature such that no decomposition or charring of the material can take place even in a relatively long time.

29. The method of preparing plastic material in a workable state, comprising intimately mixing cellulose acetate with plasticizer to form a mixture containing only materials having negligible rates of vaporization at room temperature, subjecting said mixture to a relatively high temperature to cause a rapid melting of the material to a homogeneous plastic mass in such a short time that no substantial decomposition or charring of the material takes place, agitating the mixture of plastic materials during at least a part of the time it is subjected to high temperature as aforesaid, thereafter cooling the material below a temperature at which decomposition or charring thereof can take place even in a relatively long time, and passing the material thus prepared to a point of use.

30. The method of preparing plastic material in a workable state, comprising supplying an intimate mixture of cellulose acetate and plasticizer to form a mixture containing only materials having negligible rates of vaporization at room temperature to a high temperature zone, subjecting said mixture in this zone to a relatively high temperature to cause a rapid melting of the material to a homogeneous plastic mass in such a short time that no substantial decomposition or charring of the material takes place, agitating the plastic material while in said zone by moving it through an orbital path, deflecting a selected proportion of the material from said orbital path and moving it to a second zone wherein the temperature thereof is brought down to a point such that no decomposition or charring of the material can take place even in a relatively long time, and passing the material thus prepared to a point of use.

JAMES BAILEY.

CERTIFICATE OF CORRECTION.

Patent No. 2,207,426.  July 9, 1940.

JAMES BAILEY.

It is hereby certified that error appears in the printed specification of the above numbered patent requiring correction as follows: Page 7, second column, line 67, claim 9, for "plasticizers" read --plasticizer--; page 10, first column, line 33, claim 24, for "its" read --it--; and that the said Letters Patent should be read with this correction therein that the same may conform to the record of the case in the Patent Office.

Signed and sealed this 17th day of September, A. D. 1940.

Henry Van Arsdale,
Acting Commissioner of Patents.

(Seal)